March 29, 1927.

A. E. LEWIS 1,622,951

ELECTRIC WATER HEATER OF THE STORAGE TYPE

Filed Dec. 17, 1925

A. E. Lewis
INVENTOR

By: Marks & Clark
ATTYS

Patented Mar. 29, 1927.

1,622,951

UNITED STATES PATENT OFFICE.

ALFRED EMILE LEWIS, OF CAMPERDOWN, NEW SOUTH WALES, AUSTRALIA.

ELECTRIC WATER HEATER OF THE STORAGE TYPE.

Application filed December 17, 1925, Serial No. 76,079, and in Australia January 14, 1925.

This invention is intended for use where a comparatively large quantity of hot water is required at one time, as for instance in the case of baths.

In one form it consists of a jacketed tank with a suitable insulating material filled into the space between the tank and the jacket. The tank is surrounded by a coil, preferably of copper pipe, the lower end of which is connected through the jacket, to a source of water supply, the upper end passing into the tank and terminating in a float controlled valve. The draw off pipe is connected near the bottom of the tank, passes through the jacket and will be controlled by a suitable cock. The jacketed tank is preferably provided with a jacketed cover in which is a central opening. Through the central opening in the cover an earthenware or other non-electric conducting vessel, or container for the electric heating element, is passed, such vessel being preferably of tubular shape, open at the top and provided with a flange whereby it will rest upon the cover or a flange thereon to support the vessel within the tank. The heating element vessel or container is provided with a suitable cover that rests upon the flange and may be rigidly secured thereto by any suitable means. Pendant from the cover of the element vessel are a pair of insulated rods that support and act as leads to an electrical heating element of the exposed type, the upper ends of such rods being connected to any convenient source of electric supply.

At points in the element vessel below the normal water level, when the vessel is positioned within the tank, are two short projecting tubes integral with or rigidly secured to the vessel, such tubes acting as an inlet and an outlet, the inlet being below and of a smaller diameter than the outlet.

In operation when the tank is filled or nearly so the water will flow into the element vessel and submerge the exposed heating element, the heat from which will cause the water to circulate from the vessel to the tank and vice versa when the electric current is switched on.

In the accompanying drawings—

Figure 1:
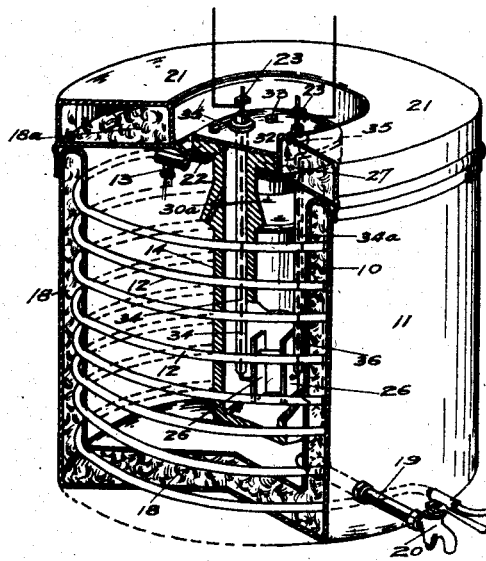

Fig. 1 is a perspective view (partly in section) of a heater constructed according to my invention.

Figure 2:
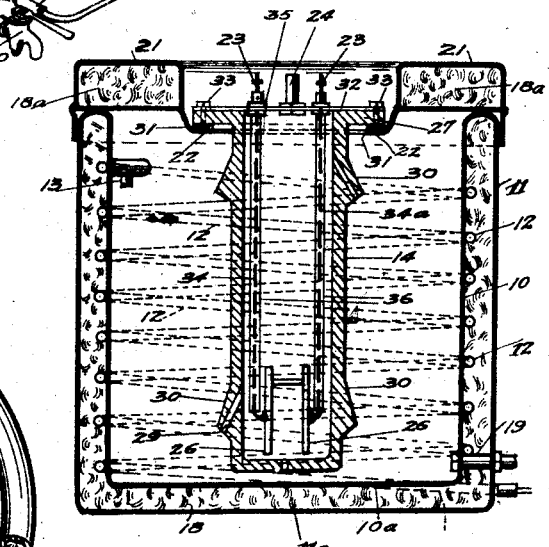
Figure 3:
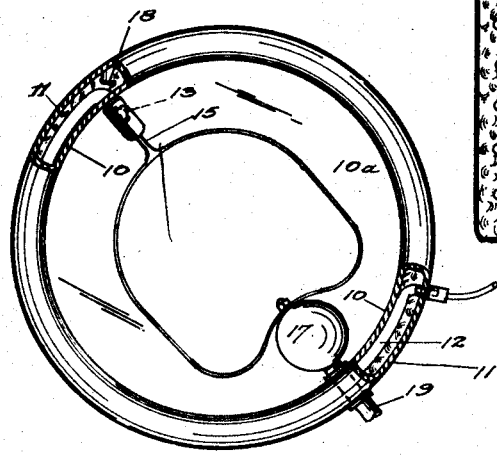

Fig. 2 is a central vertical sectional elevation of the appliance as shown at Fig. 1 and Fig. 3 is a plan of the jacketed container with the cover, the heating element and its container removed in order to show the water supply inlet valve and the float by which it is controlled, two small sections of the container and jacket being cut away to expose the pipe coil that lies between the inner and outer walls of the jacketed vessel.

The container or vessel in which the water is heated will be jacketed; it may be made of metal in any suitable manner but to simplify its construction it is preferably cylindrical in shape. Between the inner vertical wall 10 and the outer vertical wall 11 a coiled tube 12, of suitable metal and diameter, is secured, the upper end of the coil passing inwardly through the wall of the container and the lower end outwardly through the wall of the jacket. Secured to the inwardly projecting end of the coil 12 is an ordinary float controlled valve 13. The position of the earthenware heating element container 14 however will not, (in the smaller sizes) permit a straight float lever to be used and in order to overcome that difficulty a short lever 15 may be rigidly secured to or formed integral with a metal hoop 16 of suitable shape and measurement so that the latter may surround the container 14 and the float 17 be secured to the hoop at a point diametrically opposite to the short lever 15. In this manner the float may operate the float lever without causing the hoop 16 to foul the earthenware container 14. The space between the walls 10 and 11 and the bottom $10^a$ and $11^a$ of the container and its jacket is packed with a suitable insulating material, preferably silica wool 18 and the container is provided with an outlet pipe 19 that is controlled by a cock 20. The annular space at the top of the walls 10 and 11 is closed in any suitable manner and the orifices in the walls 10 and 11 through which the pipes pass will be made water tight either by soldering the pipes to the respective walls or the pipes may be screw threaded and be secured by nuts and back nuts in a manner commonly adopted for similar purposes.

The jacketed container will be closed by a hollow annular lid or cover 21 that is packed with suitable material, preferably silica wool $18^a$ and which is provided with a flange 22 projecting inwardly from the bottom of its inner vertical wall. It is preferable that this flange 22 should be bent so that it will lie below the bottom of the packed lid 21 thereby enabling the terminals 23 and vent 24 to lie within the central circular space 25 without projecting above the upper surface of the lid 21.

The electrical heating element 26 is of the exposed type of any suitable design and when in operation will be immersed in the water within the specially constructed earthenware vessel 14, which is preferably cylindrical in shape and is provided with a flange 27, one or more outlet passages 28 near the top and one or more inlet passages 29 near the bottom. These inlet and outlet passages are for the purpose of allowing the water to circulate from the heating element container to the main container and at the same time to increase the ohmic resistance and thereby reduce the leakage of current from the element 26 to the water within the main container. In order that the passages shall be of sufficient length, at the same time maintaining the strength of the container and ensuring that those parts in which the passages are formed shall not project too far the vessel is provided with a suitable number of suitably shaped lugs 30 the passages 28 and 29 being formed in the respective lugs 30 with a downward and outward inclination as is clearly shown at Fig. 2 of the drawings. The cross sectional area of the inlet passage or passages 29 should be somewhat smaller than the outlet passage or passages 28 to ensure that there shall be no chokage in the circulation of the water from the earthenware container to the main tank. In practice it will generally be found that one inlet conduit 29 and one outlet conduit 28 will be sufficient as the combined cross sectional area of these openings must be small enough to produce the necessary ohmic resistance. If the combined cross sectional area of those conduits is too great leakage will occur and danger may ensue.

The vessel 14 is passed downwardly through the central opening in the cover 21 until its flange 27 rests upon the flange 22. A suitable jointing ring 31 will be interposed between the flanges 22 and 27 and a disc 32 of suitable material placed upon the flange 27 and the whole then secured together by a suitable number of bolts and nuts 33.

The heating element 26 may be suspended at the lower ends of two metal rods 34—34ª which serve as the electric current leads, the upper ends of such rods being screw threaded so that they may be secured to the disc 32 by the nuts 35 and terminals 23. It is preferable that the rods or leads 34—34ª should be electrically insulated and for that purpose they may each be passed through a close fitting glass tube 36. The terminals 23 will be connected to the respective leads from any convenient source of electric current supply according to general electric practice.

In the manufacture of the vessel 14 it may be found advantageous to form it so that instead of there being individual lugs 30 that formation will be continued right round the vessel in order to form upper and lower annular shoulders as will be seen by referring to 30ª at Fig. 1 of the drawings, and the required number of tubular conduits formed in those annular shoulders.

I claim—

1. An electric water heater of the character described including, a double-walled storage tank, an annular lid for said tank, an annular supporting flange projecting from the inner edge of the lid, an earthenware vessel provided with an outwardly extending annular flange for engagement with the flange on the lid for suspending the vessel within the tank, the wall of the vessel being provided with openings for establishing communication with the tank, a cover disk for the vessel, electric heating elements suspended from the disk and arranged within the vessel, a coil arranged between the walls of the tank and in connection with a water supply, a float valve arranged in the upper part of the tank and connected with the upper end of the coil, and a valved controlled outlet leading from the bottom of the tank.

2. In an electric water heater as claimed in claim 1, wherein the walls of the earthenware vessel adjacent the upper and lower ends of the same are thickened while the openings which establish communication between the vessel and the tank are arranged through the thickened portions of the wall at an inclination so as to increase the ohmic resistance and reduce the leakage of current from the heating elements to the water within the tank.

3. An electric heater as claimed in claim 1, wherein the lid for the tank is recessed centrally above the supporting flange, the supporting flange being also extended downwardly so that when the earthenware vessel and the heating elements connections are attached to the disk they lie below the upper surface of the lid.

In testimony whereof, I have signed my name to this specification.

ALFRED EMILE LEWIS.